US009536334B2

(12) United States Patent
Abadie

(10) Patent No.: US 9,536,334 B2
(45) Date of Patent: Jan. 3, 2017

(54) IMAGE STRIP DISPLAY

(71) Applicant: SCHLUMBERGER TECHNOLOGY CORPORATION, Sugar Land, TX (US)

(72) Inventor: Joan Abadie, Viols-le-Fort (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 126 days.

(21) Appl. No.: 14/514,939

(22) Filed: Oct. 15, 2014

(65) Prior Publication Data

US 2015/0109341 A1 Apr. 23, 2015

(30) Foreign Application Priority Data

Oct. 18, 2013 (FR) ...................... 13 60178

(51) Int. Cl.
G06T 11/60 (2006.01)
G01V 1/50 (2006.01)
G01V 3/38 (2006.01)
G01V 1/34 (2006.01)

(52) U.S. Cl.
CPC ............... G06T 11/60 (2013.01); G01V 1/50 (2013.01); G01V 3/38 (2013.01); G01V 1/34 (2013.01); G06T 2207/20221 (2013.01); G06T 2207/30181 (2013.01)

(58) Field of Classification Search
None
See application file for complete search history.

(56) References Cited

U.S. PATENT DOCUMENTS

2004/0204855 A1* 10/2004 Fleury .................... G01V 11/00
702/6
2012/0201425 A1* 8/2012 Stolte ..................... G06T 19/00
382/106

OTHER PUBLICATIONS

Shetty, et al., "Inversion-based workflow for processing nuclear density images in high-angle and horizontal wells", SPWLA Conference Paper, 2012, 16 pgs.
"Petrophysics: The SPWLA Journal of Formation Evaluation and Reservoir Description", vol. 54, No. 4 Aug. 2013, p. 1.

* cited by examiner

Primary Examiner — Edward Martello

(57) ABSTRACT

A well log is obtained that includes log data gathered along a trajectory of a wellbore. An orientation parameter defining a perspective for displaying the log data along the trajectory is also obtained. Following a path of the trajectory, an image strip is rendered from the log data based on the orientation parameter, where the image strip is a pictorial representation of the log data. The image strip is displayed along the trajectory.

20 Claims, 7 Drawing Sheets

IMAGE STRIP DISPLAY

CROSS-REFERENCE TO RELATED APPLICATIONS

This application claims benefit under 35 U.S.C. §119(a) of French Patent Application Serial Number 1360178, filed in the French Patent Office on Oct. 18, 2013.

BACKGROUND

Operations, such as geophysical surveying, drilling, logging, well completion, and production, are performed to locate and gather valuable downhole fluids from subterranean formations. During drilling and production operations, well logs are often generated that describe properties of the subterranean formations. Specifically, the well logs include values of one or more properties in the immediate vicinity of the wellbore.

SUMMARY

In general, in one aspect, embodiments are directed to displaying log data. A well log is obtained that includes log data gathered along a trajectory of a wellbore. An orientation parameter defining a perspective for displaying the log data along the trajectory is also obtained. Following a path of the trajectory, an image strip is rendered from the log data based on the orientation parameter, where the image strip is a pictorial representation of the log data. The image strip is displayed along the trajectory.

Other aspects will be apparent from the following description and the appended claims.

DETAILED DESCRIPTION

Figure 1:
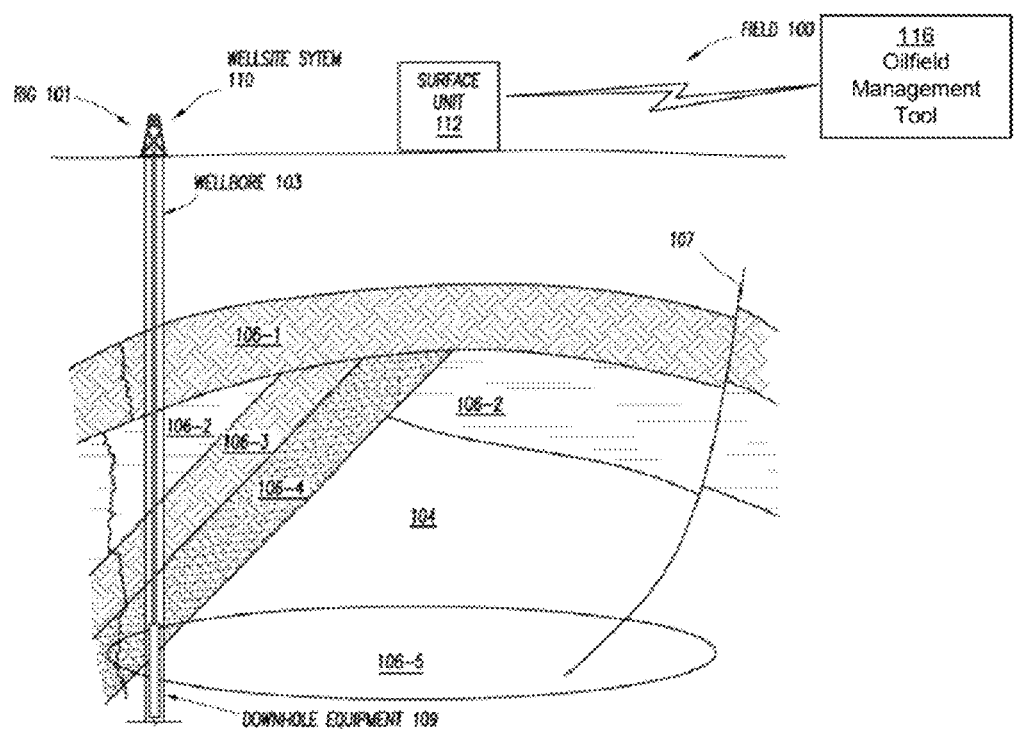
FIGS. 1 and 2 show schematic diagrams in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to a method and system for displaying log data from well logs. One or more embodiments include functionality to display an image strip, which is a pictorial representation of the log data, along the trajectory of the wellbore. Thus, a user viewing the image strip may see a pictorial representation of each value in the well log at a location that is relative to the surface of the Earth in accordance with one or more embodiments.

FIG. 1 depicts a schematic view, partially in cross section, of a field (100) in which one or more embodiments may be implemented. In one or more embodiments, one or more of the modules and elements shown in FIG. 1 may be omitted, repeated, and/or substituted. Accordingly, embodiments should not be considered limited to the specific arrangements of modules shown in FIG. 1.

As shown in FIG. 1, the subterranean formation (104) may include several geological structures (106-1 through 106-4). As shown, the formation may include a sandstone layer (106-1), a limestone layer (106-2), a shale layer (106-3), and a sand layer (106-4). A fault line (107) may extend through the formation. In one or more embodiments, various survey tools and/or data acquisition tools are adapted to measure the formation and detect the characteristics of the geological structures of the formation. Further, as shown in FIG. 1.1, the wellsite system (110) is associated with a rig (101), a wellbore (103), and other wellsite equipment and is configured to perform wellbore operations, such as logging, drilling, fracturing, production, or other applicable operations. The wellbore (103) may also be referred to as a borehole. Generally, survey operations and wellbore operations are referred to as field operations of the field (100). These field operations may be performed as directed by the surface unit (112).

In FIG. 1, the trajectory (i.e., path) the wellbore is vertical. Although FIG. 1 shows a wellbore vertical, the wellbore may be horizontal or may follow a winding path to the reservoir. During drilling and other operations in the wellbore, oilfield equipment may gather and store data in one or more well logs.

In one or more embodiments, the surface unit (112) is operatively coupled to an oilfield management tool (116) and/or a wellsite system (110). In particular, the surface unit (112) is configured to communicate with the oilfield management tool (116) and/or the wellsite system (110) to send commands to the oilfield management tool (116) and/or the wellsite system (110) and to receive data therefrom. For example, the wellsite system (110) may be adapted for measuring downhole properties using logging-while-drilling ("LWD") tools to obtain well logs and for obtaining core samples. In one or more embodiments, the surface unit (112) may be located at the wellsite system (110) and/or remote locations. The surface unit (112) may be provided with computer facilities for receiving, storing, processing, and/or analyzing data from the oilfield management tool (116), the wellsite system (110), or other part of the field (100). The surface unit (112) may also be provided with or functionally for actuating mechanisms at the field (100). The surface unit (112) may then send command signals to the field (100) in response to data received, for example to control and/or optimize various field operations described above.

In one or more embodiments, the data received by the surface unit (112) represents characteristics of the subterranean formation (104) and may include seismic data and/or information related to porosity, saturation, permeability, natural fractures, stress magnitude and orientations, elastic properties, etc. during a drilling, fracturing, logging, or production operation of the wellbore (103) at the wellsite system (110).

In one or more embodiments, the surface unit (112) is communicatively coupled to the oilfield management tool (116). Generally, the oilfield management tool (116) is configured to analyze, model, control, optimize, or perform other management tasks of the aforementioned field operations based on the data provided from the surface unit (112). Although the surface unit (112) is shown as separate from the oilfield management tool (116) in FIG. 1, in other examples, the surface unit (112) and the oilfield management tool (116) may also be combined.

Figure 2:
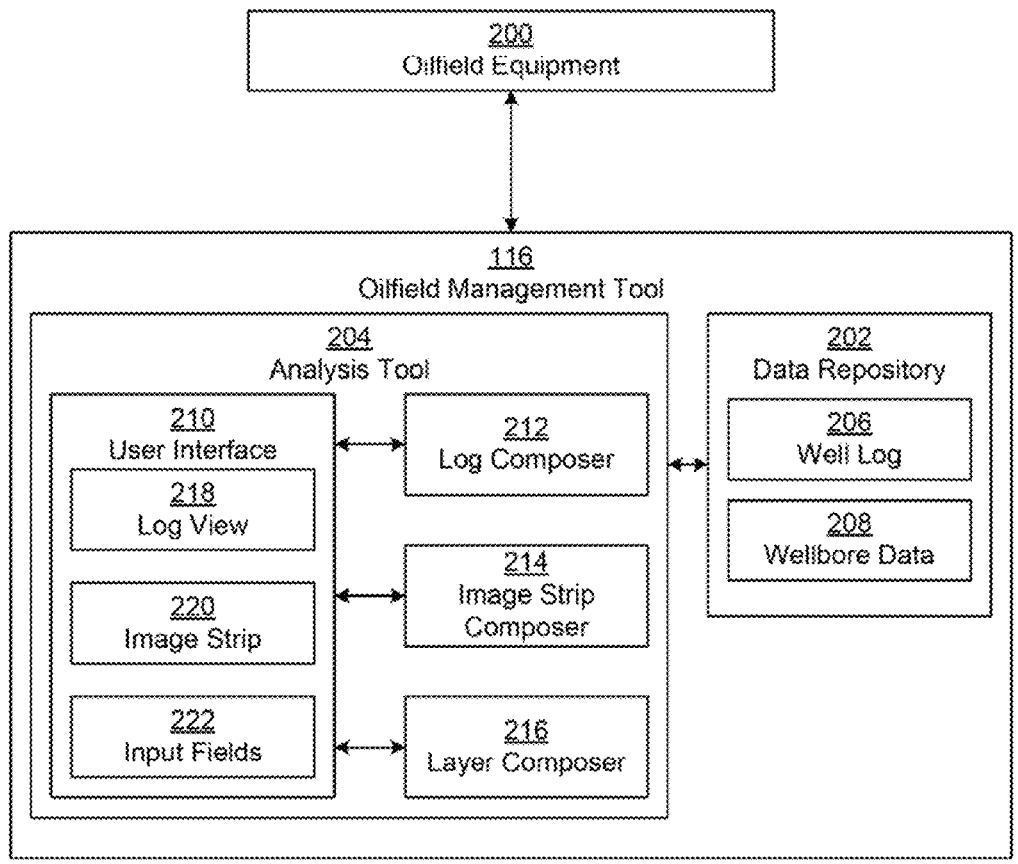

Turning to FIG. 2, FIG. 2 shows a schematic diagram of the oilfield management tool (116) in accordance with one or more embodiments. As shown in FIG. 2 and described above, the oilfield management tool (116) is connected to oilfield equipment (200). The oilfield equipment (200) corresponds to the various items of equipment that are located at the oilfield, such as the equipment shown in FIG. 1.

The oilfield management tool (116) includes a data repository (202) and an analysis tool (204) in accordance with one or more embodiments. In one or more embodiments, the data repository (202) is any type of storage unit and/or device (e.g., a file system, database, collection of tables, or any other storage mechanism) for storing data. Further, the data repository (202) may include multiple different storage units and/or devices. The multiple different storage units and/or devices may or may not be of the same type or located at the same physical site.

The data repository (202) includes functionality to store one or more well logs (206) and wellbore data (208). A well log (206) is a record of a property along the length of the wellbore. In other words, the well log (206) stores values for one or more properties of the wellbore and subterranean formation around the wellbore. Each value in the well log (206) is defined relative to the path distance to the top of the wellbore, rather than relative to the surface of the earth. The path distance may be referred to as Measured Depth (MD). For horizontal wells, the MD distance may be transformed to distance to the surface called True Vertical Depth Sub Sea (TVDSS) and the horizontal distance from the top of the wellbore called True Horizontal Length (THL). Other measurements of distance may be used without departing from the scope of one or more embodiments.

In order to simplify the description, the well log (206) may be deemed to have multiple points. Each point corresponds to a distinct and unique position or geographic location in the well. Thus, each point has a corresponding position and value(s) pair, whereby the position may be expressly or implicitly defined. For example, a position may be expressly defined by including, in the well log, a numeric value that defines the depth (MD) and radial location of the point (Angle). By way of a second example, a position may be implicitly defined if the position may be inferred based on the location of the value or values within the well log. A point may have multiple corresponding values when the values of multiple properties are acquired for the same position and stored in the well log (206).

In one or more embodiments, the well log (206) may be an image log. For example, the image log may include values for defining the presence and direction of rock fractures, dip direction, and other formation attributes in the well. In one or more embodiments, values in the well log (206) may be raw values, values with some amount of processing (e.g., preprocess values), such as for data integrity, or calculated values from raw values.

Wellbore data (208) includes additional information describing the wellbore. For example, the wellbore data may include a description of the trajectory of the wellbore, a description of the location of the wellbore in the oilfield or on Earth, The trajectory is the path of the wellbore through subterranean formations. Oilfield equipment located at the wellbore, information about production or drilling operations, and/or other information about the wellbore.

Continuing with FIG. 2, the oilfield management tool (116) additionally includes an analysis tool (204) in accordance with one or more embodiments. The analysis tool (204) includes a user interface (210), a log composer (212), an image strip composer (214), and a layer composer (216). Each of these components is described below.

In one or more embodiments, the user interface (210) corresponds to a graphical user interface that includes functionality to receive input from a user and present or display graphical data to the user. The user interface (210) includes a log view (218), an image strip view (220), and input fields (222) in accordance with one or more embodiments.

A log view (218) is pictorial representation of the log data in the well log along a straight line in accordance with one or more embodiments. In the log view, the trajectory of the wellbore is undisclosed or not shown. Rather, the log view shows the log data with one axis being path distance and the other axis representing a radial location in the wellbore. For example, the radial location may be up, down, left, right, and in-between positions, or defined with respect to degrees.

As discussed above, the log view (218) is a pictorial representation of the log data. In other words, the pictorial representation, whether log view or image strip, is that values in the well log are represented by a pixel that is colored according to the value. The coloring of the corresponding pixel is defined by a color palette. In other words, a color palette is a mapping between possible values in the well log and color values. As used herein, a color value may be a grayscale value, a red/green/blue value combination, or any other mechanism for identifying color including variants of the same color, such as gray.

In one or more embodiments, the image strip (220) is a pictorial representation of the log data that follows a path of the trajectory of the wellbore. In other words, whereas the log view is presented as a straight line, the positions of the pixels in the image strip correspond to the path of the trajectory through subsurface formations. Thus, where the trajectory may curve around a particular formation, the image strip shows the curve. Similarly, the image strip shows where the wellbore is substantially vertical or substantially horizontal.

In one or more embodiments, the image strip (220) shows a projection of a portion of the wellbore. In such embodiments, only a portion of the wellbore is shown in the image strip. For example, the portion may include a left portion, right portion, top portion, bottom portion, and/or another such portion. In particular, as an example, a left portion may be shown where the view is a vertical slice of the subterranean formation, similar to the view in FIG. 1. By way of another example, a bottom portion may be shown where the view is from above the surface of the earth looking downward at a cross section of the subterranean formation. In one or more embodiments, the projection is defined by an orientation range (start orientation and end orientation). The orientation defines the perspective from which the image strip is viewed. For example, the orientation is a position of a virtual camera or theoretical user from which the image strip is rendered.

In one or more embodiments, the image strip (220) may have a defined radius. The radius may specify the width of the image strip. For example, a narrow radius may have the log data appear compressed in the display, whereas a wide radius may have the same log data appear expanded in the display. In order to match with the real formation the radius may to be set according to the sensor range and the wellbore diameter. In some embodiments, the radius is set by default to match the Earth subsurface. In some embodiments, a user may adjust the default radius for his/her own purpose and not necessarily to match the Earth subsurface.

Continuing with the user interface (210), the input fields (222) include functionality to receive input parameters from a user. For example, the input parameters may include an identifier of a well log, a color palette, an orientation parameter defining an orientation of the image strip, a radius parameter defining a radius for the image strip, identifier of the wellbore data, and any other parameter for generating the image strip. In one or more embodiments, a maximum orientation parameter and a minimum orientation parameter are define. The maximum orientation parameter may specify a maximum radial (e.g., by degrees around or left, right, up, down) location along the wellbore. The minimum orientation parameter may specify a minimum radial location along the wellbore. Other mechanisms for defining the orientation may be used. In one or more embodiments, the input fields may include selection boxes, text fields, drop-down menus, or any other type of field for a user to input data.

Although the user interface (210) is described with respect to the log view (218) and image strip (220), the user interface (210) may include additional user interface components for oilfield analysis. For example, the user interface (210) may include components for simulation and modeling operations, components for interacting with the oilfield, including sending commands to the oilfield, and other components that are not shown or expressly described above.

Continuing with the analysis tool (204), the log composer (212) is operatively connected to the user interface (210) and the data repository (202). The log composer (212) includes functionality to generate a log view (218) of the well log (206). More specifically, the log composer (212) includes functionality to receive input parameters from the input fields (222), obtain the well log (206) from the data repository (202), and render the log view (218) for presentation, such as to display the log view in the user interface (210).

In one or more embodiments, the image strip composer (214) is operatively connected to the user interface (210) and the data repository (202). The image strip composer (214) includes functionality to generate an image strip (220) from the well log (206). Specifically, the image strip composer (214) includes functionality to receive input parameters from the input fields (222), obtain the well log (206) and wellbore data (208) from the data repository (202), and render the image strip (220) for presentation, such as display in the user interface (210).

In one or more embodiments, the layer composer (216) is operatively connected to the user interface (210), the data repository (202), and the image strip composer (214). The layer composer (216) includes functionality to generate layers for display visually on top of the image strip. Specifically, the layer composer (216) may include functionality to perform final rendering and show subsurface of the Earth geometry. The subsurface geometry may include, for example, natural faults, subsurface layers of different density, and other such information. The various operations of the log composer (212), image strip composer (214), and layer composer (216) are discussed below in FIGS. 3 and 4.

While FIGS. 1 and 2 show a configuration of components, other configurations may be used without departing from the scope. For example, various components may be combined to create a single component. As another example, the functionality performed by a single component may be performed by two or more components.

Figure 3:
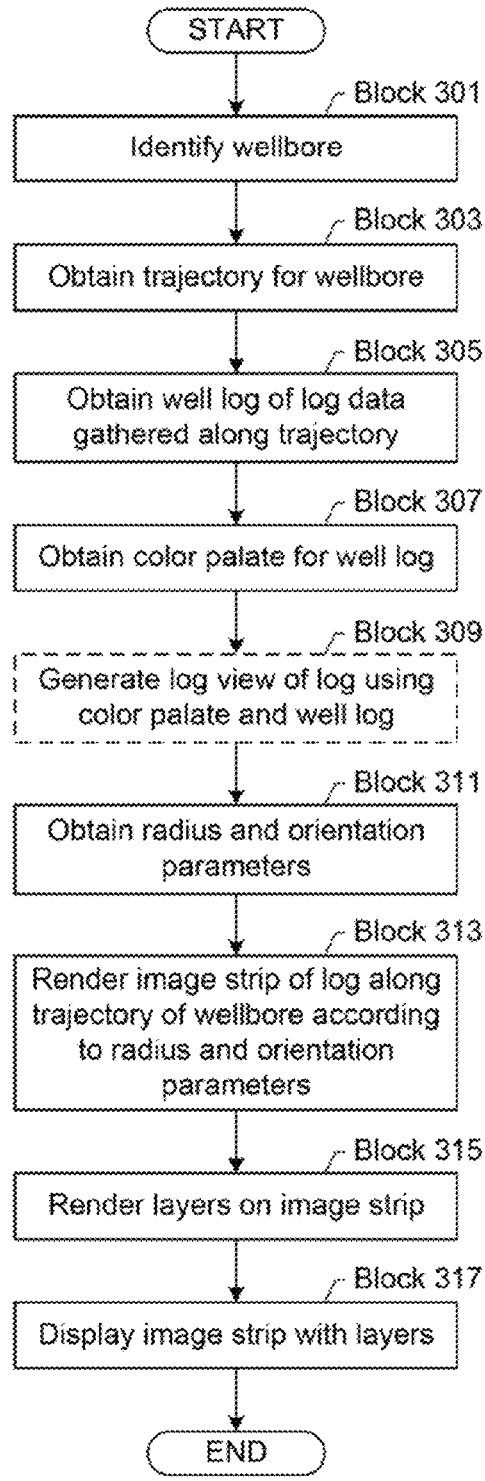
FIGS. 3 and 4 show flowcharts in accordance with one or more embodiments.
Figure 4:
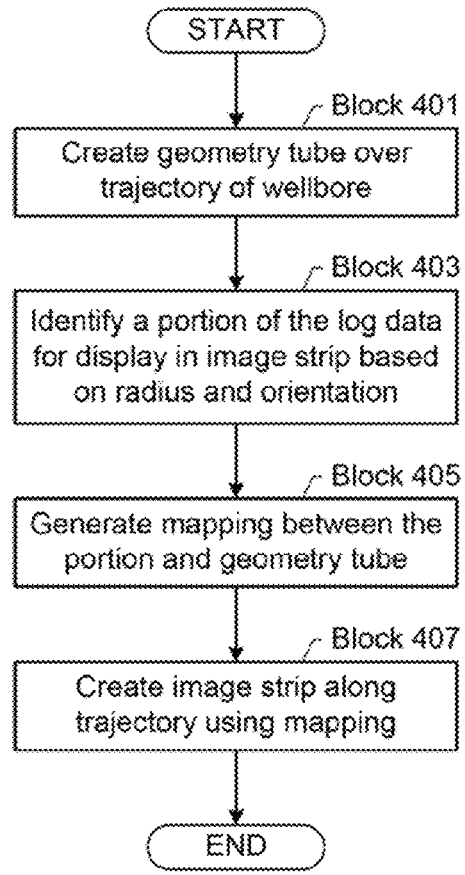

FIGS. 3 and 4 show flowcharts in accordance with one or more embodiments. While the various blocks in these flowcharts are presented and described sequentially, one of ordinary skill will appreciate that at least some of the blocks may be executed in different orders, may be combined or omitted, and at least some of the blocks may be executed in parallel. Furthermore, the actions in the blocks may be performed actively or passively. For example, some actions may be performed using polling or be interrupt driven in accordance with one or more embodiments. By way of an example, determination blocks may not require a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments.

FIG. 3 shows a flowchart for displaying an image strip in accordance with one or more embodiments. In Block 301, a wellbore is identified in accordance with one or more embodiments. In one or more embodiments, the wellbore may be identified based on being the only wellbore monitored by the user, being currently viewed in the user interface, an identifier provided in an input field of the user interface, or another identification mechanism. By way of example identifiers, the user may submit a name of the wellbore and/or a filename of a file that includes wellbore data describing the wellbore.

In Block 303, the trajectory for the wellbore is obtained in accordance with one or more embodiments. In one or more embodiments, the trajectory may be specified by the user or in a file. For example, the user may draw the trajectory in the user interface. As another example, the trajectory may be obtained from wellbore data that describes the trajectory.

In Block 305, a well log of log data gathered along the trajectory is obtained in accordance with one or more embodiments. In one or more embodiments, a user may select the well log that the user would like to display. For example, the user may select the well log from a collection of well logs gathered from the wellbore. As another example, the user may submit, in the user interface, a filename of a file having the well log. As another example, the obtained well log may be the only well log defined for the wellbore or a default well log. In one or more embodiments, the well log has a corresponding alignment. The alignment may be, for example, the distance to the top of the wellbore and other information describing how the values in the well log are defined.

In Block 307, a color palette for the well log is obtained in accordance with one or more embodiments. In one or more embodiments, the color palette may be a default color palette that is obtained from configuration parameters. As another example, the color palette may be provided by a user through the user interface in accordance with one or more embodiments. For example, the user may specify the general colors that should be used for specific values and the analysis tool may generate the rest of the mapping in the color palette. As another example, the user may select from a set of possible color palettes.

In Block 309, a log view of the well log is optionally generated using the color palette and the well log in accordance with one or more embodiments. In one or more embodiments, to generate the log view, the value of each point in the well is mapped from the well log value according to the color palette to a color. The pixel corresponding to the position of the point in the log is colored accordingly. In one or more embodiments, because the log view is in a straight line, the pixel corresponding to the point is determined based on a mapping between pixels and the path length and the radial location. By accessing the mapping, the corresponding pixel for the point is determined and colored accordingly. As discussed above, generating the log view is optional for generating the image strip. For example, in some embodiments, the image strip is generated from the log view while the image strip in other embodiments may be generated directly from the well log.

In Block 311, radius and orientation parameters are obtained in accordance with one or more embodiments. In one or more embodiments, the radius and/or orientation parameters may be default parameters or parameters specified by the user. A user may submit the parameters using the user interface. For example, the user may select a portion of the radial location axis to specify the orientation. By way of another example, the user may select the orientation from a drop down menu having optional orientations. The radius may be similarly selected by the user. By way of another example, the radius may be set by default according to the size of the wellbore.

In Block 313, an image strip of the well log is rendered along the trajectory of the wellbore according to the radius and orientation parameters in accordance with one or more embodiments. In one or more embodiments, the image strip is rendered by using the trajectory and the well log or the log view. If the log view is used, then pixels in the log view are mapped to pixels in the image strip based on the trajectory. In some embodiments, the color palette remains the same. Thus, the color of pixels in the log view are the same as the color of corresponding pixels in the image strip. In other embodiments, a new color palette may be selected. In such embodiments, a mapping may be defined between color palettes and used to set the corresponding pixel color. If the well log is used, then points in the well log are mapped to pixels in the image strip based on the trajectory and alignment information from the well log. Similar to generating the log view, the color palette may be used to set the values of the pixels. Rendering the image strip is discussed below and in FIG. 4 in accordance with one or more embodiments.

In Block 315, layers are rendered on the image strip in accordance with one or more embodiments. In one or more embodiments, rendering layers includes identifying subsurface geometry from the wellbore data and mapping the subsurface geometry to locations in the image strip. In particular, because the display of the image strip is a projection of the Earth (e.g., the axes correspond to an horizontal distance and z-plane of the Earth), positions of the image strip in the display correspond to real positions in the Earth. Thus, creation of the subsurface geometry may be performed based on the image strip display. In other words, in some embodiments, the user may create a point, move a point or layer, or otherwise manipulate and specify the subsurface geometry based on the information presented pictorially in the image strip and knowledge about the subsurface geometry. In response, one or more embodiments may render the layers of the subsurface geometry on top of the image strip. The user may continue to interact with the points in the layers until the user is satisfied that the display is a close approximation of the subsurface formation.

In Block 317, the image strip with the layers is displayed in accordance with one or more embodiments. In one or more embodiments, the image strip may be displayed on a display device in a graphical user interface. In some embodiments, the image strip may be displayed as a print out on physical paper. Other mechanisms for displaying the image strip may be used without departing from the scope. Further, as used herein, the image strip may be deemed displayed when the image strip is stored for later display in accordance with one or more embodiments.

Although not shown in FIG. 3, the displayed image strip may be used to perform oilfield operations. For example, based on the position of subterranean formations in the wellbore along with other simulations and modeling, oilfield equipment may be physically adjusted to change the monitoring of the wellbore, inject fluids, and/or extract hydrocarbons from the wellbore.

FIG. 4 shows a flowchart for rendering an image strip in accordance with one or more embodiments. In Block 401, a geometry tube is created over the trajectory of the wellbore in accordance with one or more embodiments. In one or more embodiments, the trajectory is set according to the orientation, the scale of the x and y axis in the display, and information about the actual path of the wellbore through the subsurface formations in the Earth. The geometry tube is generated that wraps around the trajectory and stores the geometry of the wellbore. In other words, the geometry tube mirrors the sides of the wellbore along the trajectory, such that the top and bottom of the geometry tube curves around the trajectory. Thus, the geometry tube is a tubular-shaped around the trajectory and follows the path of the trajectory. The geometry tube may be stored using vector faces and segments, for example.

In Block 403, a portion of the log data is identified based on the radius and orientation parameter in accordance with one or more embodiments. As discussed above, the image strip shows a certain perspective of the well log that is defined by the orientation parameter. Based on the perspective and each point's position in the well log and trajectory, certain points in the well log are visible, while other points are hidden. Thus, identifying the portion of the well log may be performed by determining, for each point, whether the point is hidden or shown in the image strip. If hidden, the point is ignored. The remaining points are identified as being in the image strip.

In Block 405, a mapping between the portion of the log data identified and the geometry tube is generated in accordance with one or more embodiments. In one or more embodiments, generating the mapping is performed by specifying a function that defines how points in the well log or log view map to the points on the geometry tube.

In Block 407, the image strip is created along the trajectory in accordance with one or more embodiments. Creating the image strip includes iterating across the points in the log data. Specifically, for each point, a value of the point in the log data is identified. According to the mapping in Block 405, a position of the point in the image strip is identified. The value is related to the position in accordance with one or more embodiments.

The iterating and operations may be performed directly or indirectly from the log data. For example, if a log view is already created, then the identified value may be the color of the pixel in the log view rather than the actual value in the log data. If the log view is not created or if the image strip is generated directly from the log data, then the value in the log data is mapped to a color value based on the color palette and set as the corresponding color of the pixel in the image strip in accordance with one or more embodiments.

FIGS. 5-8 show examples in accordance with one or more embodiments. The following examples are for explanatory purposes only and not intended to limit the scope.

Figure 5:
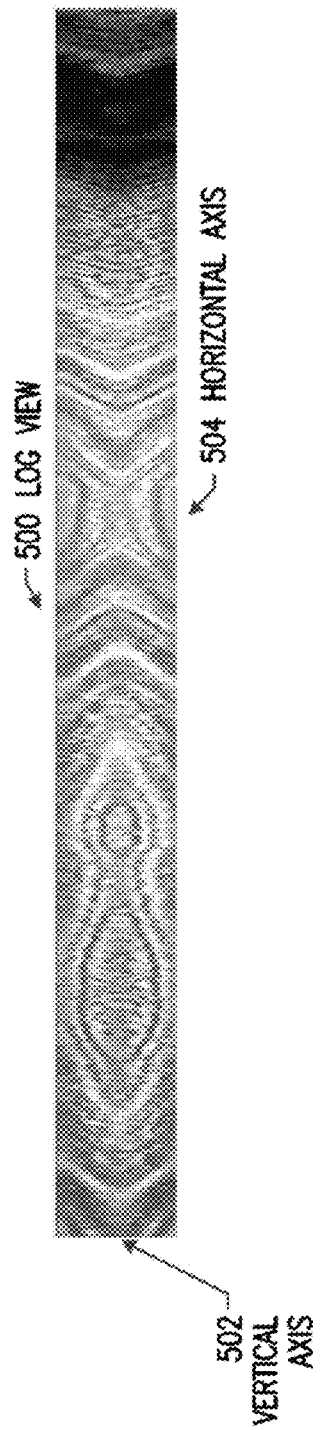
FIGS. 5-8 show an example in accordance with one or more embodiments.

FIG. 5 shows an example of a log view (500) in accordance with one or more embodiments. As shown in the example, the log view (500) is a straight line view of the well log. Specifically, the wellbore trajectory is hidden and unable to be determined from the log view (500). The vertical axis (502) of the log view (500) represents radial location while the horizontal axis (504) is THL. Although FIG. 5 shows the horizontal axis as THL, the horizontal axis may be MD or other time data. In other words, the tubular shape of the wellbore is opened lengthwise and the entire tube displayed. Thus, the bottom of the vertical axis may be zero degrees around the tube and the top may be 360 degrees around the tube. The horizontal axis (504) is the path distance along the path of the trajectory. Thus, neither the vertical axis (502) nor the horizontal axis (504) reflect the path of the wellbore through the subterranean formation.

Figure 6:
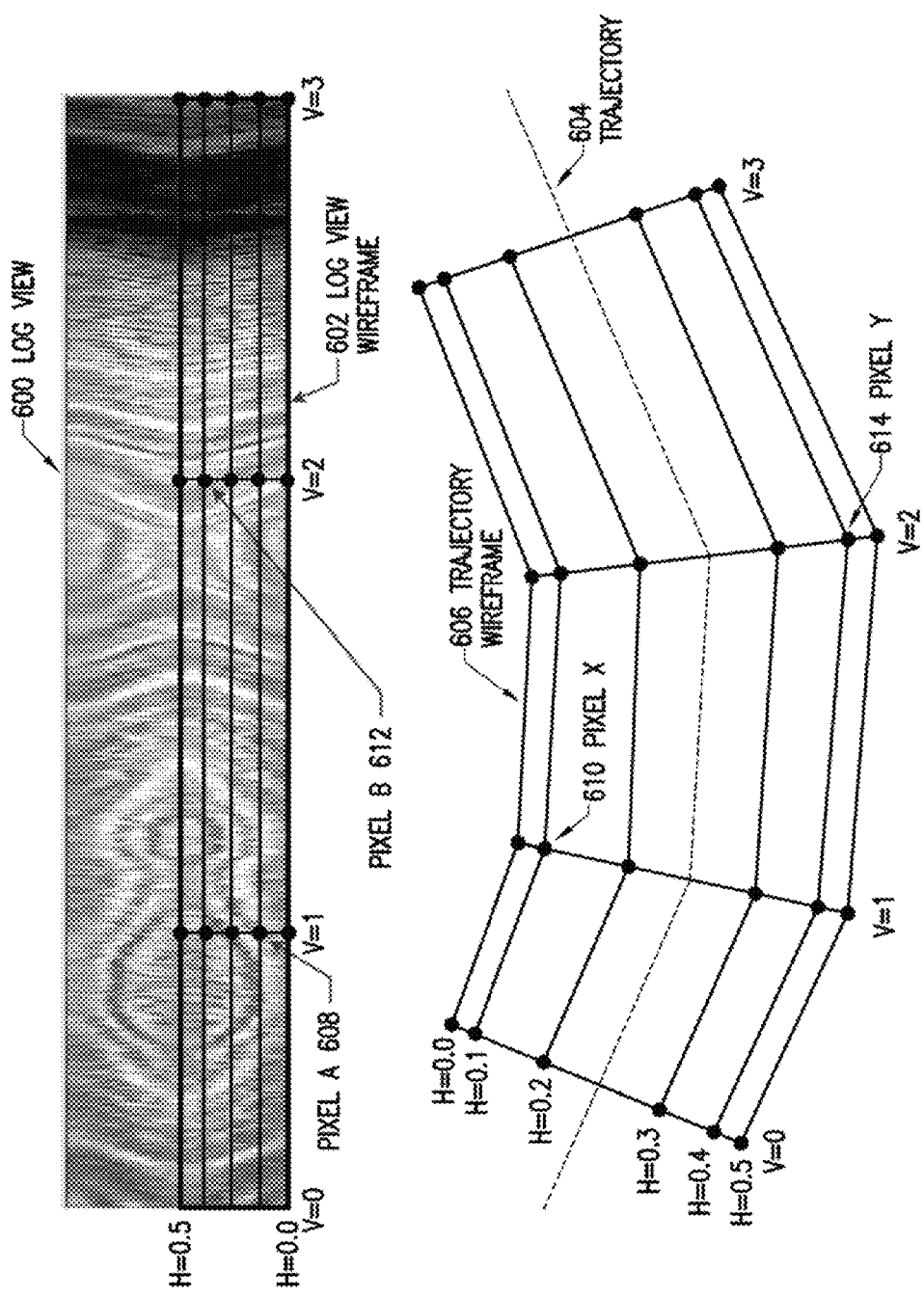

FIG. 6 shows an example of a log view (600), a log wireframe (602) on the log view (600), a trajectory (604), and a trajectory wireframe (606) along the trajectory (600) in accordance with one or more embodiments. As discussed above, the log view (602) is a lengthwise opening of the tubular shape of the wellbore. In general, the distances between points in the log view (602) are constantly scaled to the distances to the points in the wellbore. The use of the log wireframe (602) and trajectory wireframe (606) are for illustrative purposes to demonstrate a mapping between the log view and the geometry tube. In other words, the log wireframe (602) and trajectory wireframe (606) are shown to demonstrate a mapping between the log view and the image strip.

A log wireframe (602) may be placed over the log view (600). Lines on the log wireframe (602) may be spaced according to a constant scale to the wellbore. For example, horizontal lines may correspond to every centimeter of the wellbore circumference in the actual wellbore, while vertical lines may correspond to every ten centimeters of path length of the actual wellbore. As shown in FIG. 6, because distances between points in the log view (602) are constantly scaled to the distances to the points in the wellbore, horizontal lines and vertical lines that are equally spaced in the log view.

The trajectory wireframe (606) provides a skeletal three-dimensional model of the wellbore in which lines and vertices are represented and other components excluded. In other words, rather than showing the entire geometry tube that is reflective of the entire geometry of the wellbore, a trajectory wireframe is shown for illustrative purposes. Similar to the log wireframe (602), the trajectory wireframe (606) may be spaced according to a constant scale to the wellbore. For example, similar to the log view (602), the trajectory wireframe (606) has parallel lines that follow the path of the wellbore and correspond to every centimeter of the wellbore circumference in the actual wellbore. The trajectory wireframe (606) may also perpendicular lines that cross cut the path of the wellbore corresponding to every ten centimeters of path length of the actual wellbore. The amount of space between the first parallel line (H=0) in the trajectory wireframe (606) and the last parallel line (H=0.5) in the trajectory wireframe (606) may be defined according to the radius parameter in order to compute a cylindrical projection. In other words, the radius parameter may define the scale between the wellbore and the image log in the direction that is perpendicular to the trajectory. The orientation parameters define the perspective of the wellbore that is displayed in accordance with one or more embodiments.

In contrast to the log view, because the trajectory wireframe (606) displays the segments of a geometry tube wrapped around the trajectory (604), the corresponding vertical and horizontal lines are not equally spaced, but rather are progressively closely spaced at the top and bottom of the trajectory where the curve of the wellbore is shown. Further, because the trajectory wireframe (606) follows the path of the wellbore, the lines in the trajectory wireframe (606) are not necessarily vertical and horizontal, but also reflect the path of the wellbore.

Additionally, the wireframes (e.g., log view wireframe (602) and trajectory wireframe (606)) show a mapping between pixels in the image strip and pixels in the log view. Accordingly, because pixels in the log view match points in the well log, the mapping shown in FIG. 6 reflects the mapping to corresponding points in the well log. In particular, the horizontal line (H=0.0) in the log view wireframe (602) matches the parallel line (H=0) in the trajectory wireframe (606). Similarly, the horizontal line (H=0.5) in the log view wireframe (602) matches the parallel line (H=0.5) in the trajectory wireframe (606). In particular, the vertical line (V=0) in the log view wireframe (602) matches the perpendicular line (V=0) in the trajectory wireframe (606). Similarly, the vertical line (V=3) in the log view wireframe (602) matches the perpendicular line (V=3) in the trajectory wireframe (606). Thus, the mapping maps pixel A (608) in the log view (600) to pixel X (610) located on the trajectory wireframe (606), and pixel B (612) in the log view (600) to pixel Y (614) located on the trajectory wireframe (606).

As shown in FIG. 6, although the entire well log is shown in the log view (600), a portion of the well log is mapped to the corresponding image log in accordance with one or more embodiments. The portion that is shown corresponds to the perspective that is used for the image log.

Figure 7:
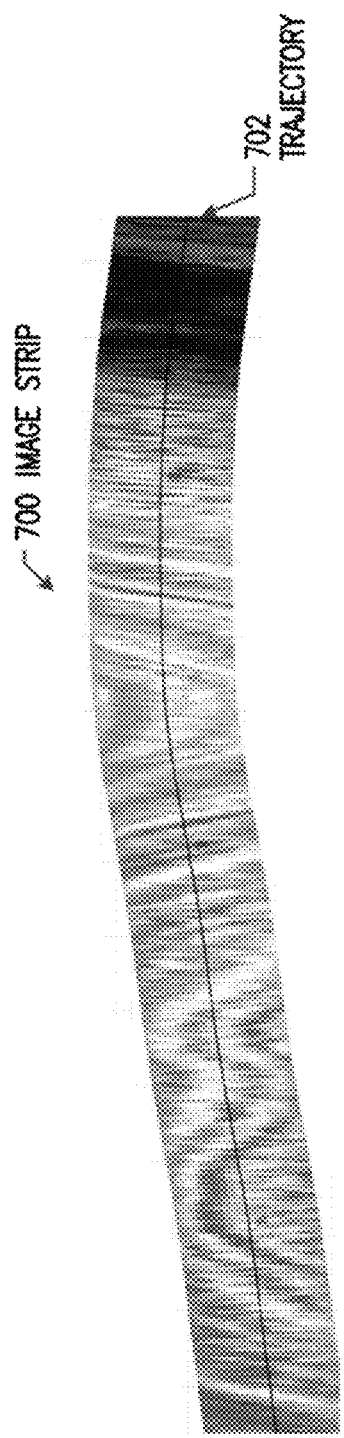

FIG. 7 shows an example image strip (700) in accordance with one or more embodiments. As shown in FIG. 7, the image strip (700) shows the log data gathered along the wellbore and following the trajectory (702). In other words, the image strip is a pictorial representation of the log data that uses colors of pixels rather than alphanumeric characters to describe the log data. In one or more embodiments, the log data is only what is visible inside the wellbore (i.e., the surface of the wellbore), rather than the subsurface formations that are any distance away from the wellbore. Further, the image strip (700) presents a projection view of the wellbore.

Figure 8:
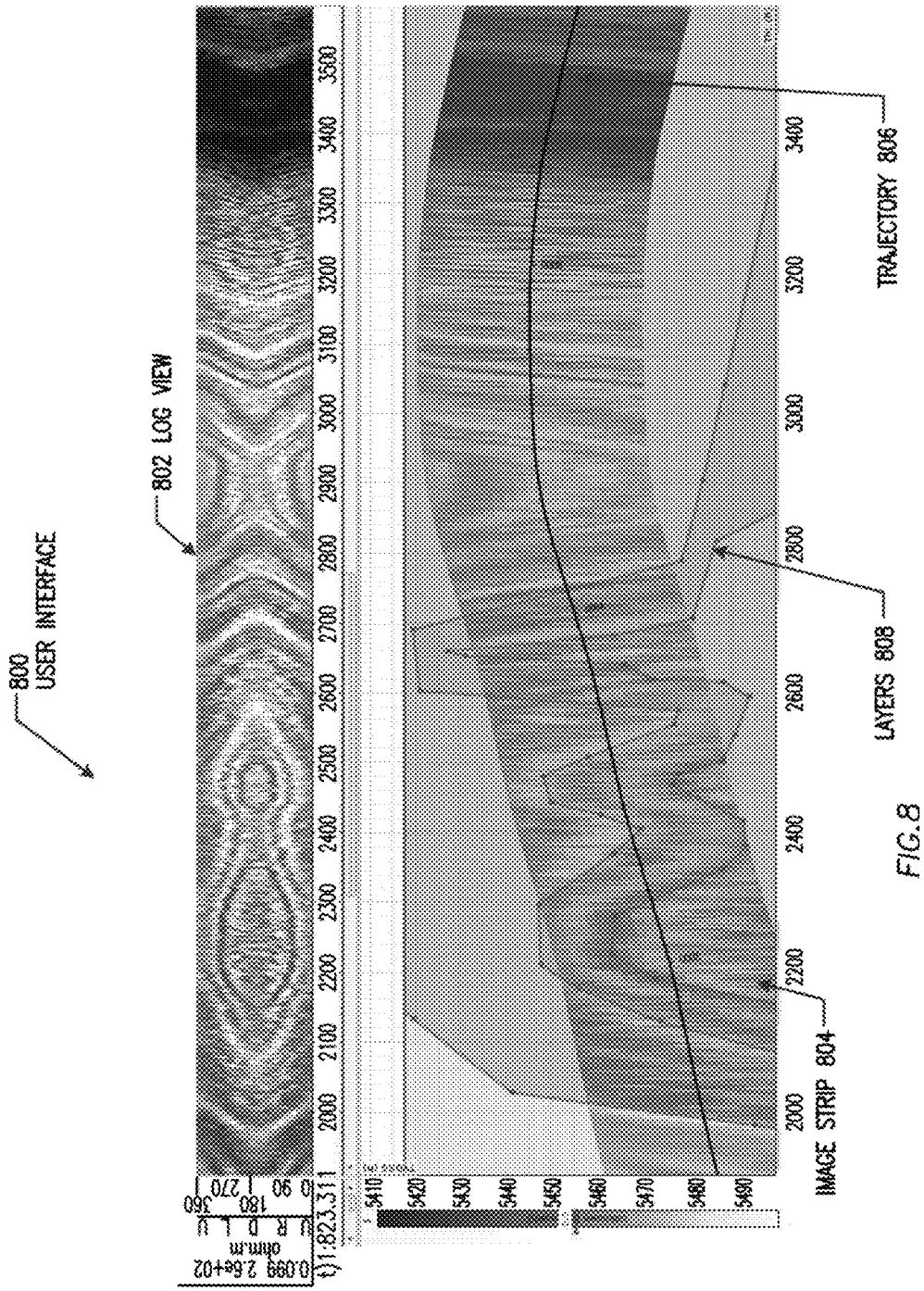

FIG. 8 shows an example user interface (800) with the log view (802) and image strip (804) in accordance with one or more embodiments. As shown in the example, the log view (802) is a straight line view of the well log whereas the image strip (804) follows the path of the trajectory (806). Further, layers (808), shown in FIG. 8 by the jagged lines on the image strip (804) and shading, may be added over the image strip (804) to reflect the subsurface geometry. The layers (808) may be generated by sensor data and may represent information gathered that is not entirely on the surface of the wellbore. Using the image strip, a user may view a projection of the wellbore according to the user's desired orientation and radius parameters.

Embodiments may be implemented on virtually any type of computing system regardless of the platform being used.

Figure 9:
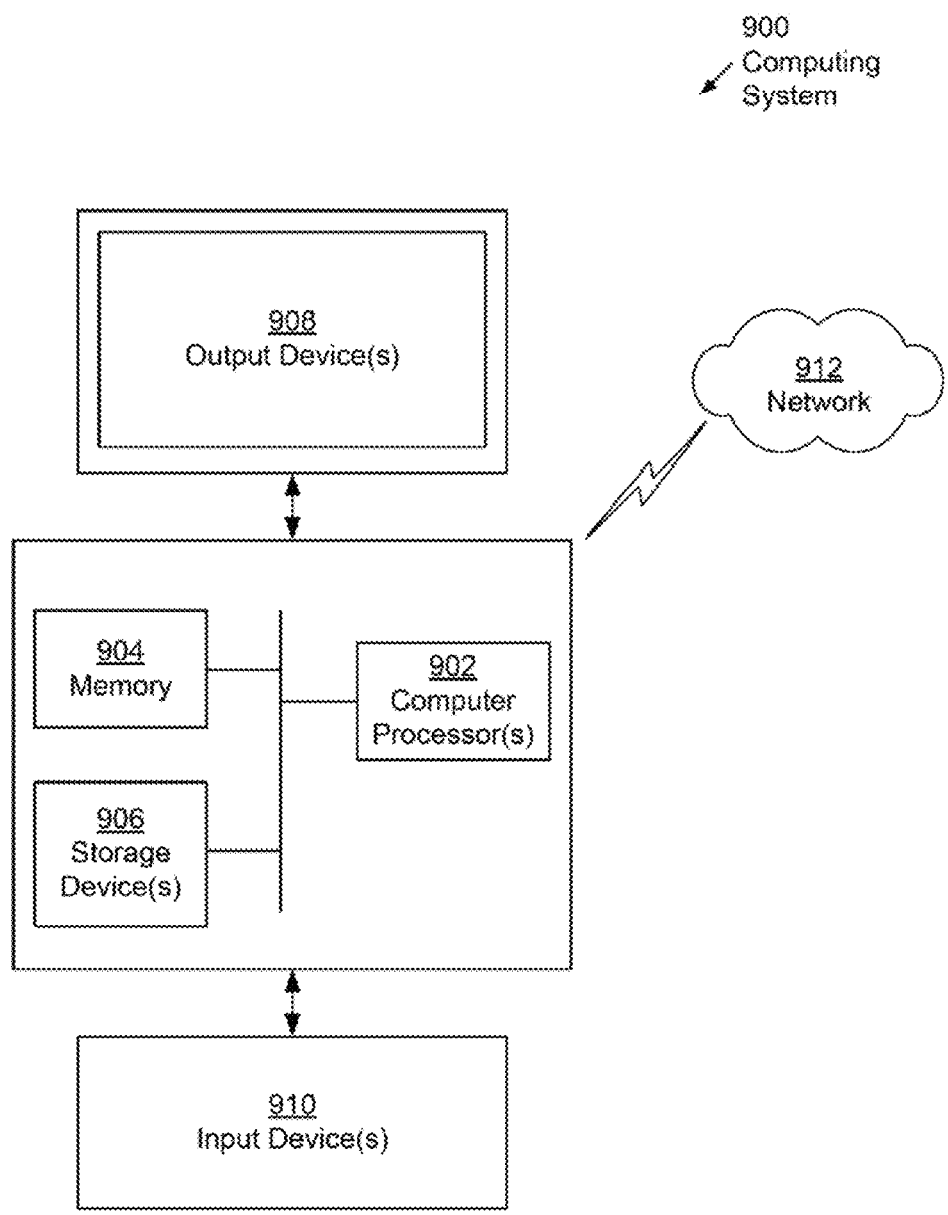
FIG. 9 shows a computing system in accordance with one or more embodiments.

For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (900) may be located at a remote location and connected to the other elements over a network (912). Further, embodiments may be implemented on a distributed system having a plurality of nodes, where each portion may be located on a different node within the distributed system. In one embodiment, the node corresponds to a distinct computing device. The node may correspond to a computer processor with associated physical memory. The node may correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A method for displaying log data, comprising:
    obtaining a well log comprising log data gathered along a trajectory of a wellbore;
    obtaining an orientation parameter defining a perspective for displaying the log data, the perspective corresponding to a radial location on the wellbore;
    rendering, following a path of the trajectory, an image strip from the log data based on the orientation parameter, wherein the image strip is a pictorial representation of the log data projected on the wellbore; and
    displaying the image strip along the trajectory.

2. The method of claim 1, wherein rendering the image strip comprises:
    creating a geometry tube along the trajectory;
    identifying a portion of the log data based on the orientation parameter;
    generating a mapping between the portion of the log data identified and the geometry tube; and
    creating the image strip along the trajectory, wherein creating the image strip comprises, for each of a plurality of points in the portion of the log data:
        identifying a value of a point of the plurality of points in the portion of the log data,
        identifying, according to the mapping, a position of the point in the image strip, and
        relating the value to the position in the image strip.

3. The method of claim 2, further comprising:
    obtaining a radius parameter defining a width of the image strip,
    wherein the geometry tube is sized based on the radius parameter.

4. The method of claim 2, further comprising:
    generating a log view of the well log, wherein the log view is a straight line display of the log data,
    wherein the mapping is between the log view and the geometry tube.

5. The method of claim 1, further comprising:
    obtaining a color palette mapping the log data to a plurality of colors, wherein the image strip is rendered according to the color palette.

6. The method of claim 1, further comprising:
    detecting a plurality of formation layers; and
    rendering the plurality of formation layers visually on top of the image strip to obtain a revised image,
    wherein displaying the image strip along the trajectory comprises displaying the revised image.

7. The method of claim 1, wherein the well log is an image log.

8. A system for displaying log data, comprising:
    a data repository for storing a well log comprising log data gathered along a trajectory of a wellbore;
    a computer processor; and
    an analysis tool, executing on the computer processor, operatively connected to the data repository, and comprising:
        a user interface configured to:
            obtain an orientation parameter defining a perspective for displaying the log data, the perspective corresponding to a radial location on the wellbore, and
            displaying an image strip along the trajectory, wherein the image strip is a pictorial representation of the log data projected on the wellbore, and
        an image strip composer configured to:

render, along the trajectory, the image strip from the log data in the well log based on the orientation parameter.

9. The system of claim 8, wherein rendering the image strip comprises:
creating a geometry tube over the trajectory;
identifying a portion of the log data based on the orientation parameter;
generating a mapping between the portion of the log data identified and the geometry tube; and
creating the image strip along the trajectory, wherein creating the image strip comprises, for each of a plurality of points in the log data:
identifying, using the mapping, a value of at least one point of the plurality of points in the log data, and relating the value to the position in the image strip.

10. The system of claim 9, wherein the user interface comprises a first input field for obtaining the orientation parameter.

11. The system of claim 10, wherein the user interface comprises a second input field for obtaining a radius parameter defining a width of the image strip, and wherein the geometry tube is sized based on the radius parameter.

12. The system of claim 9, wherein the analysis tool further comprises:
a log composer configured to generate a log view of the well log, wherein the log view is a straight line display of the log data,
wherein the mapping is between the log view and the geometry tube.

13. The system of claim 8, wherein the user interface is further configured to:
obtain a color palette mapping the log data to a plurality of colors, wherein the image strip is rendered according to the color palette.

14. The system of claim 8, wherein the analysis tool further comprises:
a layer composer configured to:
detect a plurality of formation layers; and
render the plurality of formation layers visually on top of the image strip to obtain a revised image,
wherein displaying the image strip along the trajectory comprises displaying the revised image.

15. A non-transitory computer readable medium comprising computer readable program code for displaying log data, the computer readable program code for:
obtaining a well log comprising log data gathered along a trajectory of a wellbore;
obtaining an orientation parameter defining a perspective for displaying the log data, the perspective corresponding to a radial location on the wellbore;
rendering, by a computer processor, along the trajectory, an image strip from the log data based on the orientation parameter, wherein the image strip is a pictorial representation of the log data projected on the wellbore; and
displaying, by the computer processor, the image strip along the trajectory.

16. The non-transitory computer readable medium of claim 15, wherein rendering the image strip comprises:
creating a geometry tube over the trajectory;
identifying a portion of the log data based on the orientation parameter;
generating a mapping between the portion of the log data identified and the geometry tube; and
creating the image strip along the trajectory, wherein creating the image strip comprises, for each of a plurality of points in the log data:
identifying a value of a point of a plurality of points in the log data,
identifying, according to the mapping, a position of the point in the image strip, and
relating the value to the position in the image strip.

17. The non-transitory computer readable medium of claim 16, further comprising computer readable program code for:
obtaining a radius parameter defining a width of the image strip,
wherein the geometry tube is sized based on the radius parameter.

18. The non-transitory computer readable medium of claim 16, further comprising computer readable program code for:
generating a log view of the well log, wherein the log view is a straight line display of the log data,
wherein the mapping is between the log view and the image strip.

19. The non-transitory computer readable medium of claim 15, further comprising computer readable program code for:
obtaining a color palette mapping the log data to a plurality of colors, wherein the image strip is rendered according to the color palette.

20. The non-transitory computer readable medium of claim 15, further comprising computer readable program code for:
detecting a plurality of formation layers; and
rendering the plurality of formation layers visually on top of the image strip to obtain a revised image,
wherein displaying the image strip along the trajectory comprises displaying the revised image.

* * * * *